Dec. 31, 1940.	F. S. BASTER	2,227,174
ENGINE-GOVERNOR CONTROL
Filed Dec. 16, 1938	2 Sheets-Sheet 1
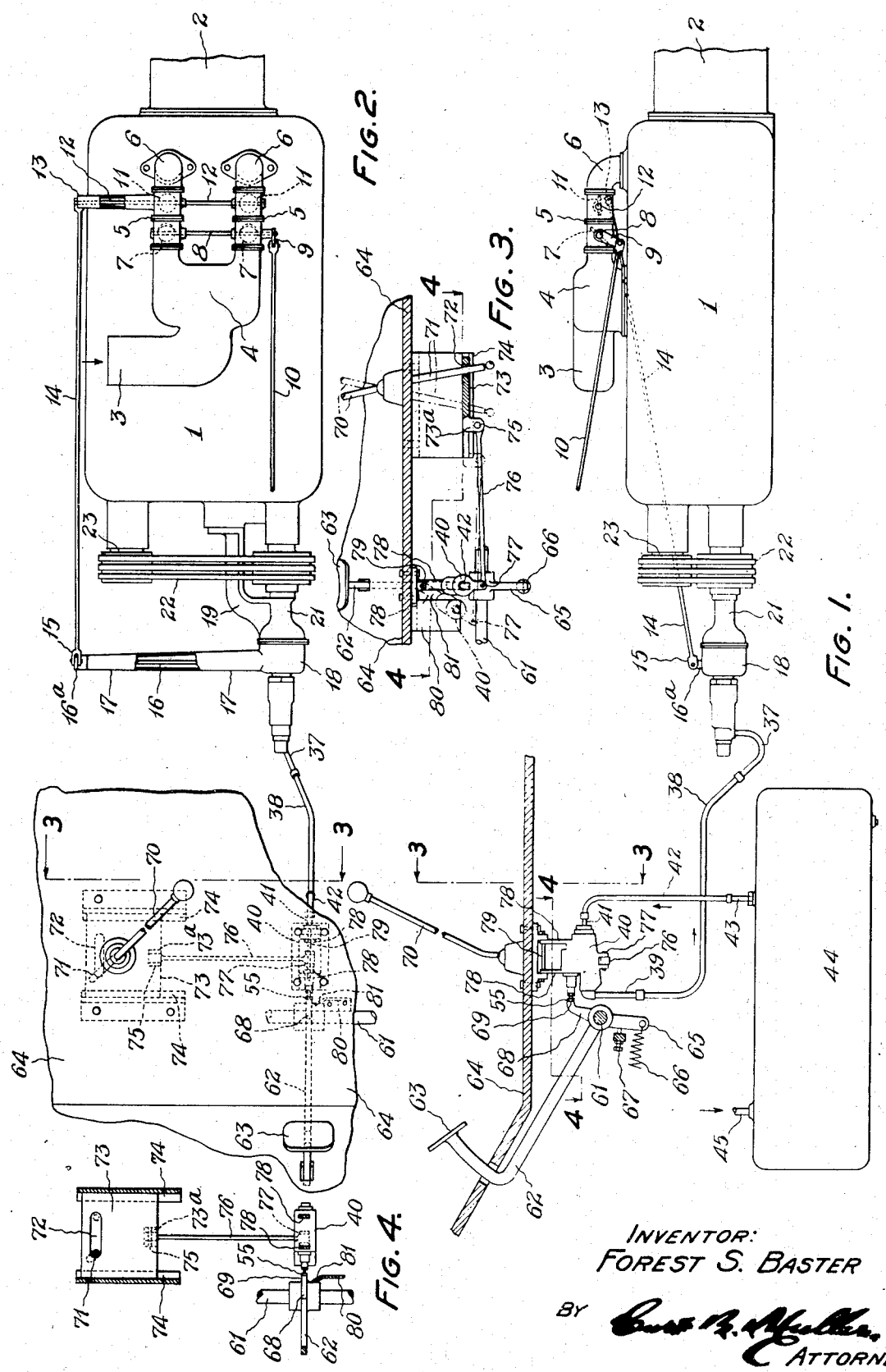
INVENTOR:
FOREST S. BASTER
BY
ATTORNEY

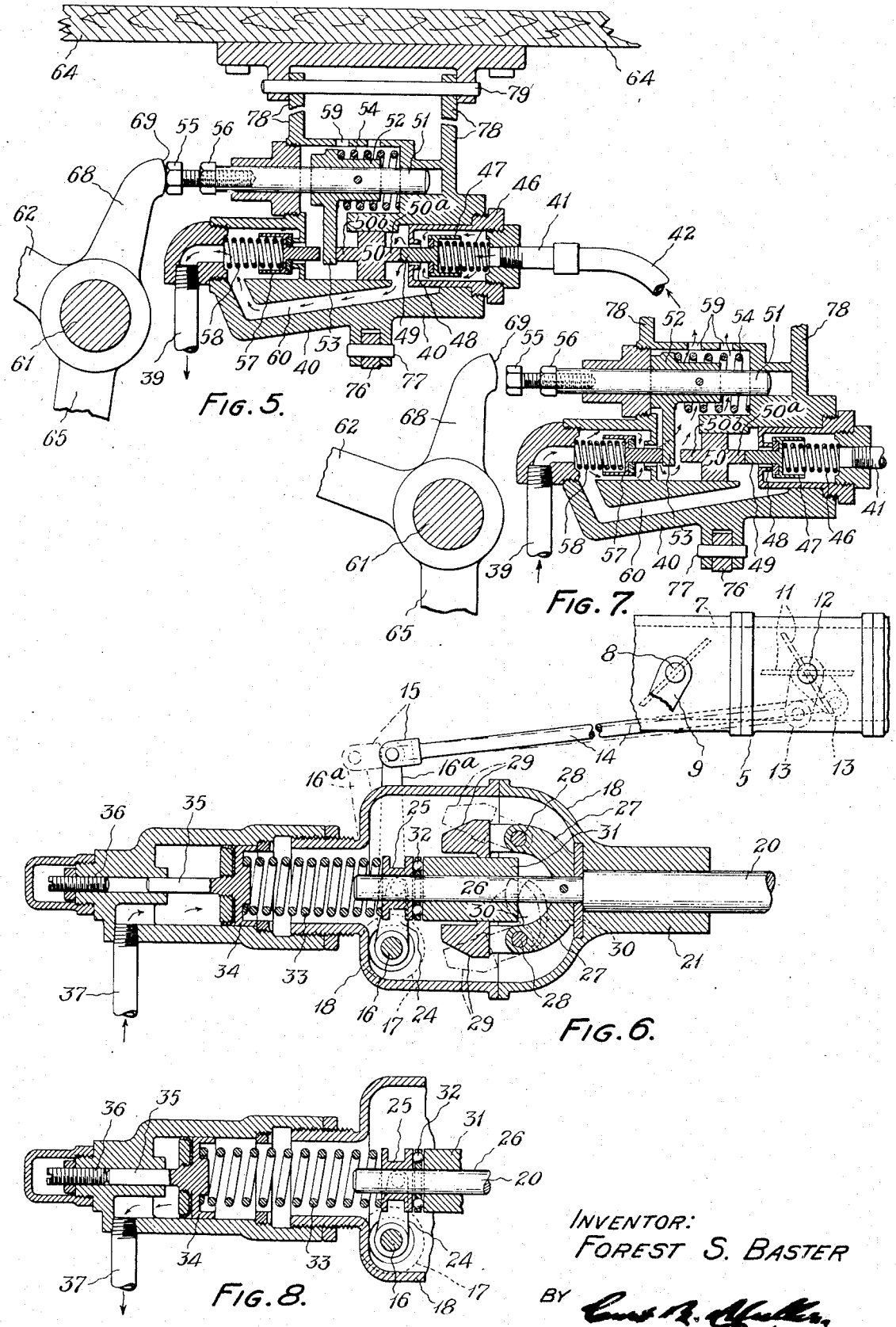

Patented Dec. 31, 1940

2,227,174

UNITED STATES PATENT OFFICE 2,227,174

ENGINE-GOVERNOR CONTROL

Forest S. Baster, Cleveland, Ohio, assignor to The White Motor Company, Cleveland, Ohio Application December 16, 1938, Serial No. 246,162

26 Claims. (Cl. 192—.01)

My invention pertains to an engine-governor control of value, for instance, if incorporated in any automotive vehicle. More particularly, it comprises means for automatically regulating the speed of an engine independently of any position of any connection between the engine and a governor. The governor might be of the mechanical (centrifugal) type or of the pressure-velocity type. The control might be mechanically or otherwise effected, for example by the cooperative use of fluid pressure. As merely exemplified in the drawings the control of the governor and incidentally of the engine speed is automatically operative upon actuation of the vehicle drive clutch of an automobile so that when the latter is engaged the exercise of function by the governor is set within prescribed limits whereas when the clutch is disengaged a dominating movement equivalent to the engine-speed-retarding function of the governor automatically occurs. In other words, whenever the clutch is released a force effective to circumvent the normal governor action becomes applied whereby the speed of the engine is retarded commensurably with predetermined adjustment and is compelled to operate at comparatively low R. P. M. until the clutch is reengaged.

The object of the chosen application of the principles of this invention is to prevent clutch failures consequent to unnecessarily rapid wear of the friction surfaces which is in turn the result of slippage due to excessive speed of rotation during reengagement of the clutch.

Adverting to the drawings:

Figure 1 is a side elevation (partly diagrammatic) showing my new speed-control appliance incorporated in an automotive power transmission assembly.

Figure 2 is a plan view of what is shown in Figure 1.

Fig. 3 is a vertical section viewed on line 3—3 of Figs. 2 and 3.

Fig. 4 is a plan section on line 4—4 of Figs. 1 and 3.

Fig. 5 is a greatly enlarged vertical section through a standard compressed air control valve shown in Fig. 1.

Fig. 6 is an enlarged vertical axial section through a standard form of centrifugal governor combined with certain features of my invention and shown operatively connected with the engine throttle as the exemplified means for regulating the speed of the engine. This view additionally shows certain parts of the governor and connected mechanism in altered dotted line positions.

Fig. 7 is a view similar to a portion of Fig. 5 showing certain valve parts in shifted positions to permit the exhaust of air from the governor.

Fig. 8 is a view similar to a portion of Fig. 6 showing the altered position of certain parts when the air pressure is released from the control spring whereby the engine speed is retarded.

A twin engine 1 may have connection at its rear end with a change-gear case 2. Mounted upon the engine is an air inlet pipe 3 leading to a twin carburetor 4 with two discharge branches which, since duplicates, may be given corresponding reference numerals. Discharge is through a pipe assembly 5 connected with an elbow 6 leading into the engine. Located within forward portions of the pipe assemblies 5 are a pair of conventional throttle valves 7 mounted on a common shaft 8, one projecting end of which carries a lever 9 with the free end of which is articulated a manual control rod 10 which, since it forms no part of this invention, need not be further explained. The rearward portions of the assemblies 5 each contains a similar throttle valve 11 carried on a common shaft 12 which extends to beyond one side of the engine and there has a similar link connection at 13 with a rod 14 the forward end of which is clevis linked at 15 to a lever 16a fixed on a crosswise rod 16 which is mounted to turn within a support 17 attached to a conventional governor housing 18 and steadied in its relation to the engine case by means of a brace 19.

Fig. 6 discloses an accessory shaft 20 entering the governor housing 18 through a bearing 21. There happens to be shown in Fig. 2 a drive 22 leading to a generator connection 23 which we have merely identified because not constituting a part of this invention. The rod 16 carries interiorly of the governor housing a conventional fork 24 which is articulated with a collar 25 loose upon a reduced end 26 of the shaft 20 whereby reciprocal axial movement imparted to the collar 25 will rock the rod 16 in reversed directions to push or pull the rod 14 and therefore to move the throttle valves 11 toward opening or closing positions respectively. Again, since the mechanism of the governor proper is of standard construction for which I am making no specific claim, only its essential interconnected parts will be very briefly described. The shaft end 26 has keyed to it a plurality of curved arms 27 each having articulated at its end 28 a centrifugally swingable weight 29 carrying a heel or thrust finger 30 adapted to engage one end of an annular slide 31. Interposed between the opposite end of the slide and the collar 25 is a ball race 32. A coil spring 33 surrounds a free end of the shaft 26 and normally serves to thrust the collar 25 rearwardly or toward the bearing 21. The maximum permissible engine speed for which the governor will have been set say 3000 R. P. M., will move the fly arms 29—30 to their dotted line positions and consequently pull the rod 14 forwardly or to the left as viewed in Fig. 6.

The other end of the coil spring 33 extends into a separable composite housing where it has the usual backing, but with the modification, in accordance with my invention, that the backing is supplied by a plunger 34 having a guided stem 35 the extremity of which is adapted to engage an adjustable stop screw 36 when pressure against the plunger is released, in a manner to be next described.

An air pressure connection through a pipe 37 is established with the space forwardly of the plunger 34 whereby application and release of pressure will correspondingly alter the rate of, specifically lessen the force exerted by, the spring 33. The pipe 37, as shown in Fig. 1, connects with a flexible tube 38 which is in turn connected with a pipe 39 entering one end of a standard, marketed control valve housing, 40 which is movably suspended, in a manner to be later described, in proximity to a vehicle-control mechanism in this instance a standard gear shift control.

The opposite end of the control valve housing 40 is connected through a pipe 41 and a flexible tube 42 with a pipe 43 through which compressed air is discharged from the tank 44 having a supply inlet 45.

The fluid pressure control valve structure, within the housing 40 is not to be claimed by itself and therefore its essential parts and operation will be rather tersely described. Flow of compressed air through the pipe 41 is subject to overcoming the contributory closing action of a spring 46 which tends to hold a valve structure 47 against its seat 48. The valve structure 47 includes a stem 49 which is smaller than the valve opening and the extremity of the stem is adapted to be engaged by 50a as one of two diametrically opposite projections 50a and 50b on a slide 50. Above is a slidable rod 51 keyed to a collar 52 having a depending arm 53 adapted to engage the opposite one 50b of the two projections on the slide 50 when the action of a coil spring 54 around the rod 51 shall be overcome. The outer end of the rod 51 carries an adjustable cap screw 55 adapted to be secured by a lock nut 56. Under the normal action of the spring 54 the arm 53 would be released from the slide 50 to permit the spring 46 to close its valve. The pipe 39 through which air pressure may be conducted from the housing 40 against the plunger 34 communicates with a valve 57 of the same design as the valve 47 and normally held closed by a spring 58. The upper side of the housing 40 is provided with a plurality of exhaust ports 59, through which air pressure against the plunger 34 may be exhausted, as indicated by the arrows in Fig. 7, when the valve 47 has been closed and the valve 57 has been opened. Fig. 8 illustrates the position of the plunger 34 and the extended formation of the spring 33 when the air pressure control has been withdrawn from the governor, necessarily to reduce the speed of the engine. The lower part of the housing 40 is provided with a passage 60 alternatively affording communication between the pipes 41 and 39, as indicated by the arrows in Fig. 5, when the valve 47 is open. If the spring 54 be compressed by the rod 51, in a manner yet to be described, the arm 53 will move to the right or to the position in which it is shown in Figure 5 so that the valve 57 is permitted to close and so that the slide 50 opens the valve 47 against the action of its spring 46 whereupon compressed air will flow only through the passage 60 and out through the pipe 39 to the governor because the slide 50 and closed valve 57 prevent communication with the ports 59. However, release of the rod 51 will cause the spring 54 to move the arm 53 to the left to release its pressure against the slide 50, permit the valve 47 to close and at the same time open the valve 57 whereby the air may be exhausted from the governor past the latter valve and out through the ports 59, as shown in Fig. 7.

Figs. 5 and 6 illustrate the consequence when compressed air flows from the tank to the governor to exercise a domination or control thereof, for increasing the time required for said governor to assume one limit of its adjustable range or delaying the functionating of the speed controlling action of said governor. Figs. 7 and 8 illustrate the altered relation of certain parts of the pneumatic control valve structure and of certain parts of the governor structure when air is exhausted from the governor whereby the engine speed is suddenly more reduced.

Next inviting attention to the undescribed disclosures in Figs. 1, 2, 3 and 4, a fixed rod 61 serves as a pivot for a clutch lever 62 which projects through, and terminates as a pedal 63 above a floor board 64 of the vehicle. The clutch lever 62 has a depending arm 65 to the free end of which a spring 66 is connected. Such spring serves to hold the pedal in an elevated position and is strong enough to overcome the spring 54. An adjustable stop screw 67 limits the movement of the arm 65 in response to the action of the spring 66. As much as has been described about the clutch lever and its connections is old practice and therefore requires no further explanation. However, my clutch lever further includes an upstanding arm 68 terminating as a pressure finger 69 which is adapted to engage the screw 55, as more clearly observable in Figs. 5 and 7, whereby to shove the rod 51 inwardly against the action of the spring 54 thereby causing the arm 53 to shove the slide 50 and open the valve 47 against the action of its spring, the valve 57 being meanwhile permitted to close whereby a relation of the parts shown in Fig. 5 becomes established. Whenever the clutch pedal 63 is depressed the finger 69 will be retracted and the parts of the pneumatic control valve will assume the positions in which they appear in Fig. 7, whereupon the speed of the engine is immediately retarded irrespective of the governor and actually to about 900 R. P. M.

A standard gear shift mechanism including a reverse and any desired number of forward speeds (three forward speeds being exemplified in Figs. 2 and 4) includes an upstanding lever 70 supported on the floor board 64 and extending therethrough with its lower end 71 passing through a slot 72 in a plate 73 which is slidable crosswise of the vehicle in guideways 74. The lower extremity of the lever 70 is to have operative connection with a gear shift appliance not shown because of no consequence to this invention. The plate 73 has a depending ear 74 with which there is pivotally connected at 75 a rod 76 extending laterally and having its other end pivotally connected at 77 with the housing 40 which is located in substantially the same vertical plane as that in which the clutch lever 62 moves and which is pivotally hung by a pair of arms 78 on a rod 79 suitably supported on the lower side of the floor board. Depending from the floor board on the outer side of the housing 40, toward which the latter may be tilted, is a plate 80 provided at its upper end with a forwardly receding surface 81. The purpose of the plate 80 is alternatively to maintain the rod 51 in its retracted position, as shown in Fig. 5, whenever the clutch pedal is depressed and its finger 69 removed from contact with the screw 55 (as shown in Fig. 7) and yet while it is not desired to have the speed of the engine quickly retarded. As will be readily understood, when lateral actuation of the plate 73 occurs and the housing 40 becomes swung aside (the flexible connections 38 and 42 so permitting) the plate 80 may serve as a substitute for the finger 69 to hold the spring 54 compressed. The inclined surface 81 is merely to ease the action of the transfer movement. In explanation for the structure which has been last described it is added that unless synchro-mesh gearing be emp'oyed it is desirable to retard the engine speed only preparatory to use of the first forward or low speed and reverse. For both the second and third speeds it is preferable to have the engine speed subject only to the normal operation of the governor.

The change-speed gears will be out of mesh whenever lateral swing of the housing 40 is to occur preparatory to substitution of the plate 80 for the finger 69 as the element for holding the rod 51 retracted and the valve 47 open and consequently without reduction of the speed of the engine. Worthy of mention also is the fact that any failure of the air pressure or equivalent control of the rate of the governor spring 33 automatically relieves the tension in it to throttle down the engine speed. The foot accelerator may be fully depressed yet when the clutch becomes disengaged, the engine speed is reduced to realize a saving of fuel.

Though it is believed that the operation of my invention will have become obvious during reading of the foregoing description and explanation of the operation of certain details, it is here added that the governor may be adjused to function to limit the maximum engine speed to say, three thousand revolutions per minute. However, when the clutch is released preparatory to shifting into either first or reverse speed, it is desirable automatically and very promptly to reduce the engine speed in order to avoid relative slipping of the friction surfaces of the clutch with attendant wear thereof. When the clutch is released and shift has been made into low gear as shown in Figs. 1-4, the fluid pressure is instantly exhausted, the backing for the governor spring becomes released and the throttle moved to effect idling engine speed independently of initiation of a movement by the governor serving to so retard the engine speed. Yet, there being no need for engine speed retardation during clutch reengagement in the higher gear ratios, the vehicle properly being then in motion, the plate 80 will substitutionally exercise the coactive rod retracting function of the arm 69 because then appositioned to the cap screw 55 to prevent the outward extension of the latter and to prevent the release of the governor spring-retaining plunger.

I would have it understood that my invention, though exemplified by showing of a mechanical governor and a fluid pressure control, is not dependent upon either, since the same results may be obtained through other instrumentalities when coordinated to effect the joint and several functions of mechanisms disclosed herein. Moreover, while my governor control or synchronizer has been designed initially so as to be automatically operative when a clutch lever is operated, it will be readily evident to those skilled in the automotive art that another vehicle control agency might advantageously become the primary actuator for an automatically operable control by whatever means the force exerted by the latter is effected whether mechanically or through the medium of fluid pressure. An electric solenoid might be applied on the spring of a velocity type governor or an electric switch might be applied instead of an air valve on a pneumatic type of control. Other structural variations will be readily conceivable to others also, yet all serving an equivalent function of the broad idea of an occasional control of a control of R. P. M. within selectable predetermined limits.

I claim:

1. In combination in an automotive vehicle, an engine, a speed-regulating device therefor, a governor connected with said engine and comprising a reactive connection to said device, said connection including a spring having its one end attached thereto and movable therewith, shiftable vehicle-control mechanism and a movable connection between said mechanism and the other end of said spring and adapted in one shifted position of said mechanism whereby to readjust the reactive connection.

2. In combination in an autmobile, an engine, a fuel throttle therefor, a governor including a centrifugally responsive actuator and connected with said engine, said actuator being adapted to regulate the position of said throttle, shiftable vehicle-control mechanism and an alternative fluid-pressure connection between said mechanism and said actuator and automatically adapted in one shifted position of said mechanism to control the position of said actuator irrespective of the tendency of centrifugal force applied thereto.

3. In an automobile, the combination of an internal combustion engine comprising a fuel throttle valve, an engine-speed governor connected with said engine and including a reactive assembly adapted to determine the position of said valve, said assembly comprising a movable element responsive to centrifugal actuation and operatingly connected with said valve and assembly further comprising a coil spring normally active to move said element to its valve-opening position, a transmission-clutch mechanism and fluid-pressure means comprising a backing member for one end of said spring and automatically operable in response to actuation of said clutch mecahnism for determining the tension in said spring and consequently the speed-controlling function of said governor.

4. In an automotive vehicle an engine, a governor including a spring and operatively connected with said engine to limit the speed thereof, vehicle-operating mechanism including an actuator, a second vehicle-operating mechanism, a device for adjusting the rate of the governor spring, an automatically operative appliance responsive to a certain movement of said actuator for controlling the position of said governor-spring adjusting device, and means automatically operated in response to a certain movement of one of said mechanisms for maintaining said device in one position of adjustment whereby high R. P. M. may occur.

5. In an automotive vehicle, an engine, a governor operatively connected with said engine to limit the speed thereof, vehicle-operating mechanism including an actuator, a gear-shift device, a fluid-pressure valve mechanism for anticipating the speed control function of said governor irrespective of engine speed, an automatically operative appliance responsive to a certain movement of said actuator for accomplishing the speed-retardation movement of the connection between the engine and the governor, and means automatically operated in response to a certain movement of said gear-shift device for maintaining said valve mechanism ineffective to control said governor and for maintaining the governor in its normal position for exercise of its speed control function in accordance with engine speed.

6. In an automotive vehicle, the combination of an engine, a governor operatively connected therewith and adapted to limit the speed thereof, two separate vehicle-operating mechansms, a device automatically operative upon occurrence of a certain movement of one of said mechanisms for anticipating the functionating of said governor and means automatically operative upon occurrence of a certain movement of the other one of said mechanisms for maintaining said device in one position of adjustment irrespective of the position of said first mentioned mechanism.

7. In combination, a prime mover including a device for regulating its performance, means for operating said device, a control appliance for operating said device independently of the position of said operating means and a second control appliance, said first mentioned appliance including a pair of parts which are separable during one of its operating movements, said second control appliance comprising an element adapted to exercise the function of one of said separable parts to maintain the effective control of said device by said first mentioned appliance.

8. In combination, a power unit including a device for regulating its power output, means for operating said device, a control appliance for operating said device independently of the action of said operating means, a second control appliance for operating said device in conjunction with only a portion of the mechanism of said first mentioned appliance, said first mentioned appliance including a pair of parts one of which is displaceable during a certain movement of said second mentioned appliance and a contrivance automatically operable upon movement of said second control appliance and adapted to coact with said displaceable part whereby to maintain the effective control of said device by said portion of the mechanism of said first mentioned appliance.

9. In an automotive vehicle, the combination of an engine including a fuel throttle for regulating the speed of said engine, a governor adapted to actuate said throttle, a vehicle-control appliance, means automatically operated by said control appliance for actuating said throttle toward its open and closed positions independently of the governor-initiated actuation of the throttle, a second shiftable vehicle-control appliance adapted, when shifted to a certain position, to interrupt the operability of said first mentioned control appliance during one of the alternatively assumed positions of said second control appliance and means automatically operable to reestablish the operability of said first mentioned vehicle-control appliance.

10. In an automotive vehicle, the combination of an engine, a throttle therefor, a connection for operating said throttle, a spring adapted to urge one element of said connection in a direction to open said throttle, a centrifugal governor adapted to move said element in a reverse direction in opposition to the action of said spring, a vehicle-control appliance and means automatically operated by said appliance for modifying the rate of said spring without concurrent positive actuation of said element whereby to establish a correspondingly lower range of R. P. M. control by said governor.

11. The combination of an engine having a throttle, a clutch, a clutch-actuating lever and connections therefrom to said clutch, a governor, a connection including a spring between said governor and throttle and means actuated by said lever for varying the rate of said spring independently of simultaneous positive actuation of said governor-throttle-connection actuation whereby correspondingly to vary the range of R. P. M. control by said governor.

12. In an automotive vehicle, the combination of an engine comprising a fuel throttle, a throttle-operating connection, a centrifugal governor for operating connection and a vehicle-control appliance for automatically operating said throttle, said appliance comprising a spring interposed in the connection between the inertia weights of said governor and said throttle, said appliance being adapted directly merely to alter the force exerted by said spring without coincident positive actuation of said throttle-operating connection whereby the governor may continue to exercise its R. P. M. control function through a correspondingly lower range of engine speed.

13. In an automotive vehicle, the combination of an engine comprising a fuel throttle, a throttle-operating connection, a governor adapted to actuate said connection and a vehicle-control appliance for automatically operating said throttle, said appliance comprising: a spring also adapted to actuate said throttle-operating connection, a backing member for that end of said spring which is remote from the throttle-operating connection and fluid-pressure means for controlling the position of said backing member and consequently the resultant force exerted by said spring.

14. In combination, in an automotive vehicle, a vehicle-control appliance, an engine, a governor for regulating the speed of said engine, mechanism automatically operated by said appliance for modifying the exercise of function by said governor, and periodically operated means for arresting the operation of said mechanism.

15. In combination, in an automotive vehicle a vehicle-control appliance, an engine, a throttle, a governor, a connection between said throttle and governor, a separated member movably mounted on the vehicle and adapted for bodily shift toward and away from a bodily movable element of said connection, a spring arranged between said element and said separated member and adapted to urge said connection in one direction and mechanism automatically operated by said appliance and adapted to effect the bodily movement of said member whereby independently to vary the rate of said spring.

16. In an automobile, an operating control appliance therefor, an engine, an engine governor, an engine throttle, a connection between said governor and throttle, said connection comprising a housing, a plunger reciprocable in said housing and a spring between said plunger and another element of the governor-throttle connection, said spring tending to vary the distance between said plunger and element and fluid-pressure means automatically operated by said appliance operatively associated with said housing and adapted to control the position of said plunger and therefore the rate of said spring and range of R. P. M. control accomplished by said governor.

17. In an automotive vehicle, an engine, governor-mechanism, comprising a pair of pressure-engaged members, a vehicle-control appliance and a fluid-pressure valve mechanism automatically operable by said appliance and adapted to vary the pressure between said pair of members whereby to modify the engine-speed-retarding action of said governor.

18. In an automotive vehicle, the combination of a vehicle-control appliance, an engine, a throttle therefor, an engine governor, a connection between said throttle and governor comprising a pair of bodily movable elements and a spring therebetween, said spring tending to open said throttle, said governor being adapted to move one of said elements against the action of said spring to retard the speed of the engine and mechanism automatically operable upon actuation of said appliance and adapted alternatively to hold the other one of said elements in a predetermined spring-backing position or to permit its bodily movement in response to the force exerted by said spring whereby to vary the rate of the latter and consequently the range of effectiveness of said governor.

19. In an automotive vehicle an engine, a governor including a spring and operatively connected with said engine to limit the speed thereof, a clutch including an actuator, gear-shift mechanism, a device for adjusting the rate of the governor spring, an automatically operative fluid-pressure valve structure adapted to be operated by said actuator for controlling the position of said governor-spring adjusting device, and means automatically operated in response to a certain movement of said gear-shift mechanism for maintaining said device in one position of adjustment whereby high R. P. M. may occur.

20. In an automotive vehicle, an engine, a governor operatively connected with said engine to limit the speed thereof, a clutch including a clutch lever, a vehicle-control device, a fluid-pressure valve mechanism for anticipating the speed control function of said governor irrespective of engine speed, an automatically operative appliance responsive to a certain movement of said clutch lever for accomplishing the speed-retardation movement of the connection between the engine and the governor, and means automatically operable in response to a certain movement of said vehicle-control device for maintaining said valve mechanism ineffective to control said governor and for maintaining the governor in its normal position for exercise of its speed control function in accordance with engine speed.

21. In an automobile, the combination of an internal combustion engine, a governor connected with said engine and including a reactive assembly adapted to limit the speed of the latter, said assembly comprising a movable element responsive to centrifugal actuation and said assembly further comprising a spring normally active to move said element, a transmission-clutch mechanism and means comprising a movable connection with one end of said spring and automatically operable in response to actuation of said clutch mechanism for determining the rate of said spring and consequently exercise of the speed-controlling function by said governor.

22. In an automotive vehicle an engine, a governor operatively connected with said engine to limit the speed thereof, vehicle-operating mechanism including an actuator, a second vehicle-operating mechanism, a device for adjusting said governor, an automatically operative appliance responsive to a certain movement of said actuator for controlling the position of said device, and means automatically operated in response to a certain movement of one of said mechanisms for maintaining said device in one position of adjustment.

23. In an automobile, an engine, an engine-speed-change-effecting actuator, a governor mechanism including a resisting spring with its one end attached thereto, said mechanism being operatively connected with said actuator and adapted to determine the position thereof against the action of said spring, both ends of said spring being bodily movable, clutch mechanism and a device automatically operable upon release of said clutch mechanism for effecting the bodily movement of the other end of said spring and for anticipating the functionating action of said governor.

24. In an automotive vehicle, a throttle therefor, a governor, a connection between said throttle and governor, said connection including an element adapted to be moved by said governor and further including a spring arranged to resist such movement of said element, clutch mechanism and a device automatically operative upon a clutch-release actuation of said mechanism to lessen the force exerted by said spring.

25. In an automotive vehicle, an engine having a throttle, a governor, a connection between said throttle and governor and including a spring overcome by the action of said governor, vehicle-operating mechanism including an actuator and a device automatically operative upon actuation of said mechanism, said device including a spring adapted to have its function restrained upon movement of said actuator in one direction and to be permitted to alter the force exerted by said first mentioned spring upon movement of said actuator in an opposite direction.

26. In combination, a speed-regulating element, a governor operatively connected therewith, two separate vehicle-operating mechanisms, an automatically operative fluid-pressure device responsive to a certain movement of one of said mechanisms for exercising the function of said governor and means automatically operated in response to a certain movement of the other one of said mechanisms for maintaining said device in a certain position.

FOREST S. BASTER.